ELECTRONIC AMPLIFIERS

Filed Jan. 3, 1955 3 Sheets-Sheet 1

INVENTOR
ROGER CHARBONNIER
By Holcombe Wetherill & Brisebois
ATTORNEYS

Jan. 20, 1959 R. CHARBONNIER 2,870,269

ELECTRONIC AMPLIFIERS

Filed Jan. 3, 1955 3 Sheets-Sheet 2

INVENTOR
ROGER CHARBONNIER
By Holcombe, Wetherill & Brisebois
ATTORNEYS

Jan. 20, 1959 R. CHARBONNIER 2,870,269

ELECTRONIC AMPLIFIERS

Filed Jan. 3, 1955 3 Sheets-Sheet 3

INVENTOR
Roger Charbonnier
By Holcomb, Wetherill & Brisebois
ATTORNEYS 2,870,269

ELECTRONIC AMPLIFIERS

Roger Charbonnier, Meudon-Bellevue, France, assignor to Rochar Electronique

Application January 3, 1955, Serial No. 479,570

Claims priority, application France January 6, 1954

16 Claims. (Cl. 179—171)

It is known that thermionic tube amplifiers at present used for amplifying currents of a frequency extending from a few cycles per second up to frequencies of the order of a few kilocycles or a few tens of kilocycles per second use these tubes chiefly in accordance with two classes of operation, known as class A and class B.

The maximum theoretical energy efficiency which can be obtained from such an amplifier arrangement, delivering its maximum power, is about 50% in class A and about 77% in class B, and decreases at a greater rate than the power is reduced from the maximum.

Higher efficiency can be obtained by using a so-called class C arrangement, in which the tubes work substantially in pulses, but in which the distortion becomes so considerable that it can no longer be corrected.

It is for this reason that this last arrangement is only used in selective high-frequency amplifiers operating with an oscillating circuit load, in which the pulses produced by the tubes are used for shock-excitation of this circuit.

The present invention is for an improved amplifier arrangement and is characterized by the use in the last state of two thermionic elements operating on the all-or-nothing principle with an efficiency in the neighbourhood of unity whatever the power delivered, but in which the distortion is practically negligible because the input signals, in the form of square waves, have a width which varies as a function of the signal to be transmitted, this relationship being ensured by a modulator arrangement, and a very high frequency, in relation to the maximum frequency of the transmitted signal, and because the anode load of each thermionic element comprises a recovery element, recovering energy originating from the symmetrical element in favour of the source of supply.

The invention also provides an improved electronic modulating arrangement receiving the variable potential to be amplified and making the thermionic elements non-conductive or conductive in accordance with a predetermined rhythm and duration.

The invention further has reference to an amplifier for audible frequencies of high energy efficiency, comprising in the input stage an electronic arrangement receiving the alternating voltage to be amplified and transforming this voltage into a series of square waves of a width depending on the initial modulation, having a defined rhythm which is high in relation to the upper frequency of the modulation to be transmitted and two thermionic elements in the output stage, the operation of which on the all-or-nothing principle being controlled by the aforesaid modulator, the essential characteristic of the amplifier being that it comprises, in the element forming the anode load, elements which recover energy originating from the symmetrically opposed element in favour of the source of supply.

In the preferred embodiment of the invention the power amplifier as such, that is to say the second component element already referred to, uses gas-discharge tubes, more generally known under the name of "thyratrons," operating on the all-or-nothing principle having an intrinsic energy efficiency higher than that of vacuum electronic tubes normally used.

A tube is said to operate on the "all-or-nothing" principle when once any current starts to flow in the plate circuit, this current promptly rises to the maximum permitted by the conditions in the plate circuit and is not modulated by the grid. Thyratron tubes inherently operate in this manner, and once fired cannot be shut off by the grid. Vacuum tubes, especially screen grid tubes, may also be operated on the all-or-nothing principle, provided their grids are driven by signals of suitable wave forms in such a way that the transitions between cut-off and saturation are of negligible duration. An example of such operation is herein described in connection with Figure 3. When vacuum tubes are employed in this manner cut-off is nevertheless effected by means of the grid.

A description will now be given, by way of example, of the invention, the description being made with reference to the accompanying drawings.

Figure 1:
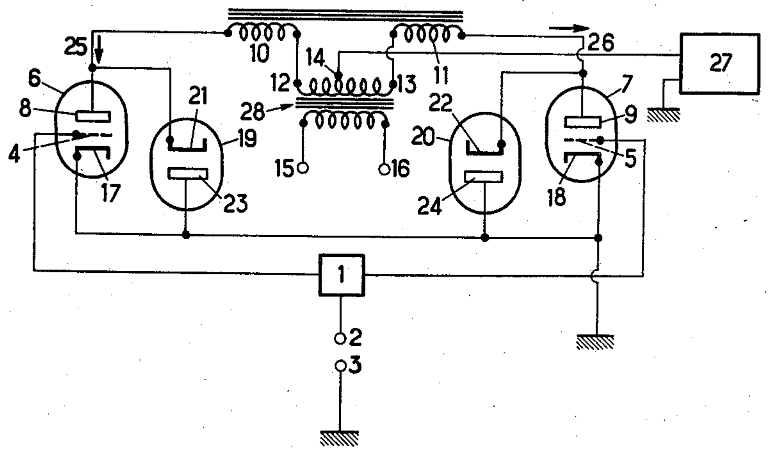
Fig. 1 is a circuit diagram according to the invention.

With reference to Fig. 1, which illustrates an amplifier according to the invention, 1 represents a modulator which receives from the terminal 2 the alternating signal to be amplified applied between the terminals 2 and 3, terminal 3 being connected to the chassis of the apparatus. The modulator 1 feeds the control grids 4 and 5 of the two thermionic tubes 6 and 7.

The modulator 1, of which a detailed example will be given later, supplies to the grids 4 and 5 with alternating signals of a frequency several times higher than the highest frequency in the frequency range of the amplified signal, these modulating signals having, in a particular application of the invention, a quasi-rectangular shape and a constant amplitude, their modulation factor (which is by definition in magnitude and sign the quotient of the difference between the duration of a positive square wave and a negative square wave, divided by the sum of the duration of these two squares waves), being constantly proportional to the instantaneous value of the signal to be amplified.

At the output of the modulator 1 there are two square wave voltages, having modulation factors of the same absolute value but opposing signs.

In other words, if during a certain time interval one of the outputs of the modulator 1 feeds to the grid 4 a square wave signal of which the positive parts last longer than the negative parts, a signal of which the negative parts last longer than the positive parts will be fed to the grid 5, the relationship of the durations of the negative to the positive parts measured at the grid 5 being equal to the relationship of the positive to the negative parts measured at the grid 4. The result of this method of control is that the tubes 6 and 7 operate alternatively as unidirectional conductive elements and as non-conductive elements, non-conduction corresponding to the duration of the negative signal on the grid (4 or 5) of the thermionic tube (6 or 7) under consideration.

The anodes 8 and 9 of the valves 6 and 7 are connected by two inductances 10 and 11, tightly coupled to one another in a sense which will be described later, to the end tappings 12 and 13 of a transformer 28 having a centre tap 14 connected to the positive pole of a source of supply of high voltage 27. The load impedance or resistance is connected to the terminals 15 and 16 of the secondary of transformer 28. The cathodes 17 and 18 of the tubes 6 and 7 are connected directly to the negative side (e. g. the chassis of the apparatus) of the high voltage supply source 27, this side being considered as a point of reference, and for convenience hereinafter termed the chassis.

The arrangement also comprises two diodes 19 and 20 of which the cathodes 21 and 22 are connected to the anodes 8 and 9 of the valves 6 and 7, and of which the anodes 23 and 24 are connected to the chassis.

In a variation of the arrangement which has just been described condensers may be connected in parallel with each half of the primary of the output transformer 28, that is to say on the one hand between the point 12 and chassis or the centre tapping 14 connected to the high voltage source 27, and on the other hand between the point 13 and chassis or the centre tapping 14.

These condensers act to eliminate the very high frequency components, and may be replaced by the self-capacitance of the windings of the transformer 28 or by conventional filter circuits.

Figure 4:
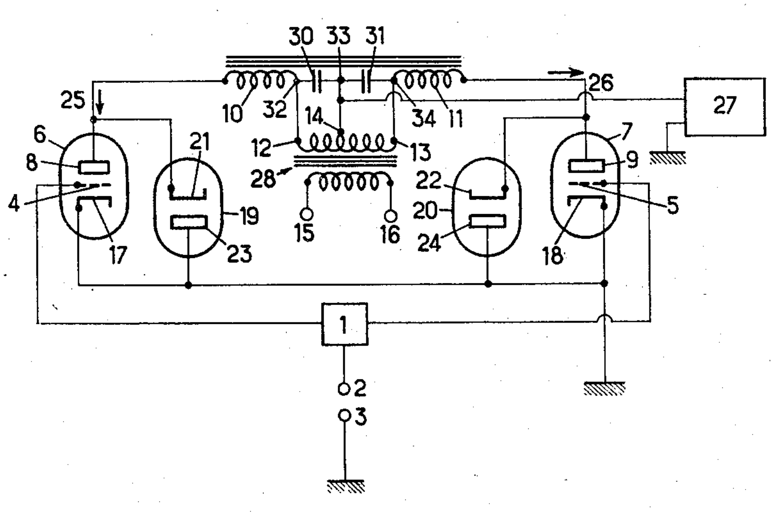
Fig. 4 is a circuit diagram similar to Fig. 1, but with the addition of condensers 30 and 31.

Fig. 4 shows the addition to the circuit of Fig. 1 of two condensers 30 and 31 positioned between the point 14 and the points 12 and 13 respectively. In practice, as may be seen on Fig. 4, the condenser 30 is positioned between the end 32 of the inductance 10 (which is at the same potential as the point 12) and the point 33 (which is at the same potential as the point 14), while the condenser 31 is positioned between the point 33 and the end 34 of the inductance 11 (which end is at the same potential as the point 13).

The circuit of Fig. 4 is otherwise identical with that shown in Fig. 1, and functions in the same manner, except that the condensers 30 and 31 eliminate the very high frequency component.

The arrangement represented in Fig. 1 operates as follows:

Let there be currents in the branches 25 and 26 circulating in the circuit starting from the high voltage source 27, leaving the output transformer 28 at the points 12 and 13 and passing through the inductances 10 and 11 to the anodes 8 and 9.

Be it supposed that the current first flows through the tube 6 and the tube 7 is consequently cut off. When the device is first connected up the potential on the anode 8 is of course substantially zero, but then becomes positive and the current in branch 25 increases in a substantially linear manner with time as shown between 0 and 1 on Fig. 2. The diode 19 remains non-conductive since its cathode is connected to the positive anode 8 and the current in branch 26 is zero.

Because of the coupling between the inductances 10 and 11, the anode 9 is brought to a high potential depending on the respective potentials of the points 12 and 13 and the degree of coupling between the inductances 10 and 11.

The sense of the coupling between the inductances is aiding, that is to say, is so chosen that an increasing current in branch 25 induces a potential difference across the terminals of the coil 11 in a sense such that the potential of the anode 9 connected to one of these terminals is higher than that of the tapping 13 which is connected to the other. The diode 20 is itself also non-conductive, because its cathode 22 is raised to a high positive potential.

At the end of a certain time interval determined by the operation of the modulator 1, the polarity of the square waves reverses. The tube 6 which was conductive is cut off in its turn, and the tube 7 tends to become conductive.

However, because of the energy stored in the inductances 10 and 11, the sudden cessation of the current in the branch 25 gives rise to a transient counter-current which induces a reversed potential difference across the terminals of the coil and consequently causes a rapid drop of potential on the anode 9, which potential would even become negative if the diode 20, the cathode of which tends to become negative in relation to the anode 24, did not reach the conductive state, thus allowing current arising from the stored energy stored in the inductances 10 and 11 to flow through the diode 20.

Figure 2:
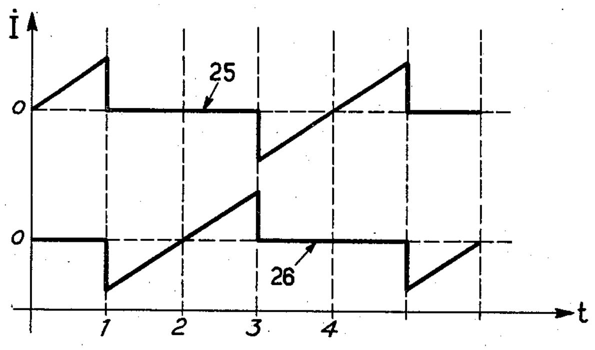
Fig. 2 represents the wave form of the current obtained in the various phases of operation of the circuit of Fig. 1.

This transient current in the branch 26 is then negative, and its absolute value decreases linearly as a function of time, as shown between 1 and 2 on Figure 2.

On the other hand the potential at the anode 8 and consequently at the cathode 21 is high, preventing the diode 19 from functioning so that the current 25 remains zero.

After this second phase of operation, the counter current in branch 26 finally ceases, the anode 9 becomes positive and the tube 7 can pass current in its turn, and this current in turn increases positively in a substantially linear manner with time, as shown between 2 and 3 on Figure 2.

The phenomenon then continues exactly as has just been described, for the other group of components, that is to say the tube 7 operates as the tube 6 operated, and the diode 19 takes the place of the diode 20. There is thus a second two-cycle operation, as a result of which the circuit of Fig. 1 returns to its initial state.

It can thus be said that, due to the energy accumulated in the inductances 10 and 11, the circuit operates through a cycle in four phases.

In the absence of an input signal, that is to say the modulation at the terminals 2 and 3 in Fig. 1, the currents in the branches 25 and 26 can be diagrammatically represented by the diagram of Fig. 2, in which the ordinates are current values and the abscissae are times, each unit of time representing one of the phases previously mentioned.

In the absence of modulation (the case of Fig. 2) the four phases have the same duration, the mean current is zero and the expenditure of energy is theoretically zero (in practice, because of the use of necessarily imperfect components which absorb a certain amount of energy, which however remains low in relation to the energy dissipated in a conventional arrangement, there is produced a slight alteration of the shape of the signals just described).

In the case of a varying low-frequency modulation, the phases assume unequal durations because of the alteration of the modulation factor, and the mean intensity of the currents in branches 25 and 26 is no longer zero and varies at low frequency. A low-frequency potential difference then appears between the points 12 and 13, which are considered to be short-circuited (by their parasitic capacities or additional capacities) for the frequency of the square waves, and there is consequently a transfer of energy to the load connected to the secondary 15—16 of the output transformer 28.

It is evident therefore that, if the modulation factor varies faithfully with the input signal, the output voltage forms a faithful replica of the input signal, on condition, however, it must be understood, that the frequency of the square waves is great enough not to influence the range of frequencies to be reproduced.

The power dissipated in the valves 8 and 9 (Fig. 1) is always very small, the anode voltage and current of the same tube never being able to assume high values simultaneously, and their product consequently always having a low value. The result, which is very important, is that the power delivered may be very great with thermionic tubes of low anode dissipation.

In addition, it may be noted that if the modulation contains no direct component no direct current flows in either half of the primary of the output transformer 28, and the latter can consequently be calculated, as and given the size of, a normal industrial transformer working on alternating current, and is consequently only subjected to the conditions of the range of frequencies which it is intended to transmit.

From the foregoing it is apparent that the operation of the arrangement of Fig. 1 is conditioned by the use of a modulator 1 providing square waves, the modulation factor of which depends on the input signal. A suitable modulator for putting the invention into operation will shortly be described with reference to Fig. 3.

Either vacuum tubes, gas-filled tubes known as "thyratrons" or elements having similar properties when operating on the all-or-nothing principle, such as semi-conductor elements, may be used for the components 6, 7, 19, 20. Operation of the all-or-nothing principle may be resorted to in well-known manner also with thyratrons or semiconductors. If vacuum tubes are used, it is current practice to use tetrodes or pentodes.

Square waves having inclined overts in place of the horizontal overts can then be used with object of reducing the power dissipated at the screen grids.

It is, in fact, known that when the anode voltage of a tetrode or a pentode falls below a certain value, the proportion of cathode current flowing in the screen grid circuit increases considerably. It is evident that the grid voltage may be as low as desired during the whole of the period when the anode voltage is lower than the cathode voltage (portion 1—2 in Fig. 2) without having the least unfavourable effect on the operation of the circuit. From the instant when the anode becomes slightly positive and anode current starts to flow, it is desirable for the grid voltage to be such that the screen current is just equal to the permissible maximum. It is sufficient for this purpose, as the valve characteristics show, for the grid voltage to be a certain linear and increasing function of the anode voltage, which can be achieved very easily by providing suitable negative feedback between anode and grid.

Figure 3:
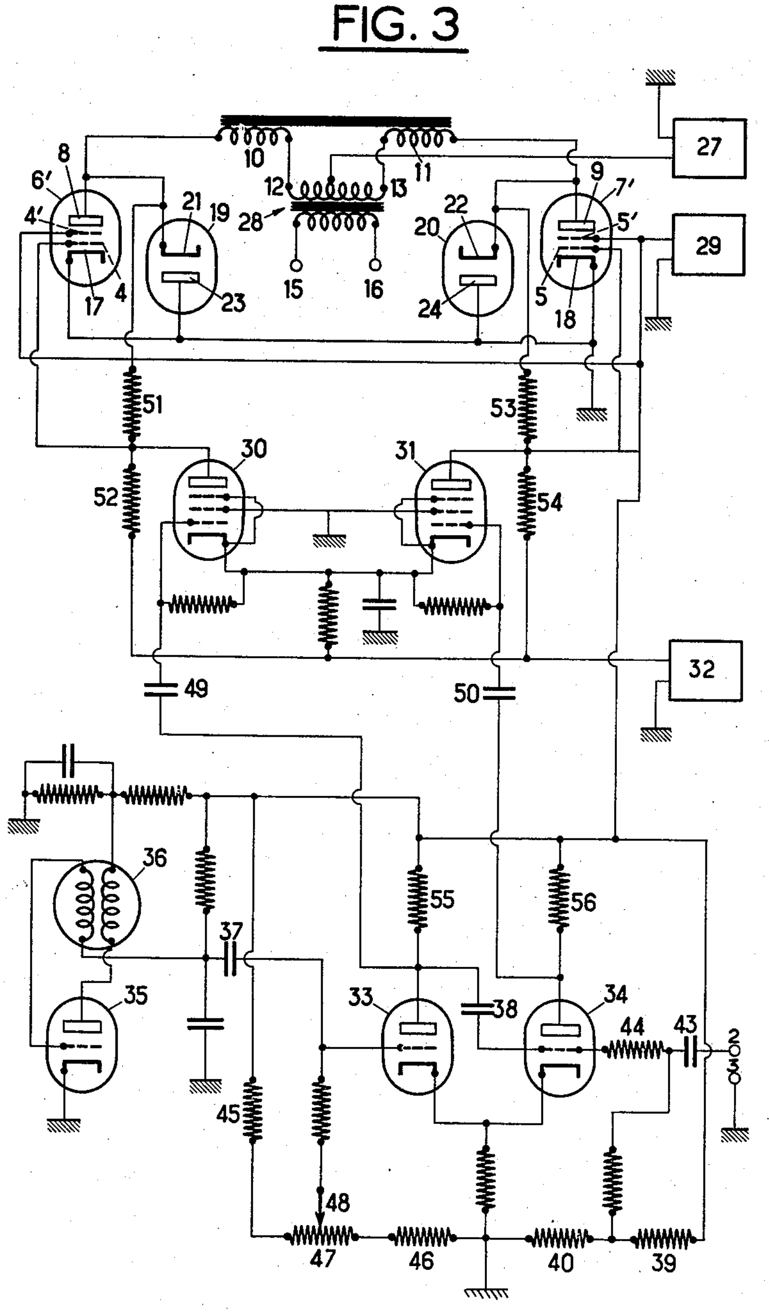
Fig. 3 is a circuit diagram showing in greater detail a complete low-frequency amplifier used for carrying out the invention.

The invention will be better understood when vacuum tetrodes or pentodes are used if reference is made to the following description of a particular circuit diagram of a low frequency amplifier shown in Fig. 3, the last stage thereof consisting of two tetrodes 6' and 7'. The screen grids 4', 5' of these tetrodes are connected to a fixed source of positive voltage 29. The reference numbers of the other elements of the last stage are the same as those of the last stage represented in Fig. 1. The upper part of Fig. 3 in fact corresponds almost exactly to Fig. 1. In Fig. 3, on the other hand, a modulator represented only by a square 1 in Fig. 1 is shown in detail.

The modulator of Fig. 3 consists of five tubes as follows: two pentodes 30 and 31 arranged in symmetrical fashion, fed from a source of negative voltage 32 and acting as a switch; two triodes 33 and 34 coupled to one another by their cathodes, arranged as a multivibrator and controlling the pentodes 30 and 31; a triode 35 arranged as a blocking oscillator with a transformer 36.

The blocking oscillator formed by the triode 35 and the transformer 36 is of the kind used for line deflection in television sets, and is well known because of this fact. It is fed from the same voltage source 29 as the triodes 33 and 34. The output of the blocking oscillator 35, 36 is fed to the grid of the triode 33 by the condenser 37. The oscillator thus synchronises the multivibrator 33, 34. The anode of the triodes 33 is connected to the grid of the triode 34 by a low-value condenser 38. The grid of the triode 34 is biased by a voltage divider consisting of two resistances 39 and 40 connected between the source 29 and chassis.

The low-frequency signal to be amplified is applied between the terminals 2 and 3, and is fed to the grid of the triode 34 via an isolating condenser 43 and a resistance 44; this resistance 44 and the condenser 38 together have a time constant which is short compared to the shortest cycle of the low-frequency range to be transmitted; thanks to the presence of the resistance 44 the reaction effected by the condenser 38 in the multivibrator 33, 34 is not short-circuited by the source of impedance at low frequency; on the other hand the short time constant of the condenser 38 and the resistance 44 allows the whole of the low-frequency signal applied between the terminals 2 and 3 to be transmitted to the grid of the triode 34. Two equal load resistances 55 and 56 are connected between the anodes of the triodes 33 and 34 respectively and the voltage source 29.

Substantially rectangular signals appear at the anodes of the triodes 33 and 34, the signals at the anode of the tube 33 being in opposite phase to those at the anode of the tube 34. For each tube (33 or 34), the relationship between the durations of square waves of opposite sign is a function of the difference between the grid voltage of the tube 34 and that of the tube 33. The grid of the tube 33 is biased by a voltage divider (connected between the source 29 and chassis) comprising two resistances 45 and 46 separated by a potentiometer 47, the slider 48 of which determines the potential on the grid of the tube 33.

This potentiometer is adjusted in the absence of a signal so that the rectangular signals appearing at the anodes of the tubes 33 and 34 have equal positive and negative peaks. The low-frequency voltage applied to the terminals 2 and 3, while causing the grid voltage of the tube 34 to vary, at the same time causes the relative width of the positive and negative square waves of the multivibrator 33, 34 to vary. The square waves are thus modulated in relative width by the low-frequency signal applied between the terminals 2 and 3.

The two rectangular signals thus obtained are applied to the grids of the pentode tubes 30 and 31 by condensers 49 and 50 respectively. These tubes are fed from a source of negative voltage 32 so that their anodes can be directly connected to the grids of the tubes 27 and 28. The amplitude of the rectangular signals is such that the tubes 30 and 31 are either highly conductive or completely cut off. When one of the tubes 30 and 31 is cut off the other is conducting and vice versa.

The grids 4 and 5 of the tubes 6' and 7' receive negative feedback voltages coming from the anodes 8 and 9 of these tubes. This negative feedback is provided for each of the grids by a bridge formed by the resistances 51 and 52 for the grid 4 and the resistances 53 and 54 for the grid 5, the resistances 52 and 54 being connected to the negative voltage supply 32. These resistances are of such value that when, for example, the tube 30 is cut off the voltage on the grid 4 causes the tube 6' to conduct; at this instant current starts to flow in the tube 6' and thanks to the negative feedback to the grid 4 of this tube, there is automatically such a voltage that the current at the screen grid 4' of the tube does not exceed the permitted value. The same process takes place for the tube 7'. Putting the device described into operation in fact causes not rectangular signals but sensibly triangular signals to be applied to the control grids 4 and 5 of the tubes 6' and 7'. It is to be understood that these signals may be applied by any other process, particularly by an independent generator of triangular wave-form signals.

What I claim is:

1. A low frequency electronic amplifier for amplifying an input signal comprising in the last stage thereof at least one pair of electronic amplifying tubes symmetrically connected between ground and a voltage source for operation on the all-or-nothing principle, each of said tubes comprising an anode, a cathode, and a control element consisting of at least one electrode positioned between said anode and cathode, means for alternately causing one of said amplifying tubes to become conductive and the other non-conductive, said means comprising means for supplying to said control elements an alternating signal having a frequency several times higher than the highest frequency range of said input signal in such manner that the alternating signal supplied to one control element of each pair is opposite to the alternating signal being simultaneously supplied to the other control element, separate electro-magnetic means for transiently storing energy in the anode circuits of each of said tubes, said energy storing means being coupled together in aiding relationship, and a diode connected in parallel with each of said amplifying tubes, with the cathode of the diode connected to the anode of said amplifying tube, said diodes alternately by-passing current derived from said stored energy about said amplifying tubes during intervals when no current is circulating through either amplifying tube.

2. An amplifier as claimed in claim 1 in which the anodes of said amplifying tubes are connected to the opposite ends of a transformer primary, the output is taken from the secondary of said transformer and the frequency supplied to said control element is shorted across said primary by capacitance means.

3. An amplifier as claimed in claim 2 in which a high voltage supply line is connected to the center of said transformer primary and the anodes of said diodes and the negative terminals of said amplifying tubes are all grounded to the chassis of the amplifier.

4. An amplifier according to claim 1 in which said means for supplying an alternating signal to said control element is a modulator which converts said input signal, which is of varying frequency and amplitude, into modulated waves of substantially rectangular form of the high fundamental frequency of said alternating signal and constant amplitude, such that the relationship between the duration of the positive and negative peaks is a function of the varying voltage of said input signal, said modulator being connected to supply said signal waves to said control means.

5. An amplifier as claimed in claim 4 in which said wave of rectangular form is modified to triangular form by means of a negative feedback from the positive terminal of said amplifying means to its control means.

6. An amplifier according to claim 1 in which said means for supplying an alternating signal to said control element is a modulator which converts said input signal, which is of varying frequency and amplitude, into modulated waves of substantially triangular form of the high fundamental frequency of said alternating signal and constant amplitude, such that the relationship between the duration of the positive and negative peaks is a function of the varying voltage of said input signal, said modulator being connected to supply said signal waves to said control means.

7. A low frequency electronic amplifier for amplifying an input signal comprising in the last stage thereof an even number of electronic amplifying devices symmetrically connected between ground and a voltage source, each of said devices comprising a positive terminal, a negative terminal, and a control element for rendering said devices alternatively highly conductive for a portion and completely non-conductive for another portion of the current cycle when suitable potentials are applied to said control element, means for supplying to said control element an alternating signal having a frequency several times higher than the highest frequency range of said input signal in such manner that the alternating signal supplied to one amplifying device of each pair is opposite to the alternating signal being simultaneously supplied to the other device and thereby alternately rendering each of said devices conductive and non-conductive, separate electro-magnetic means for transiently storing energy in the anode circuits of each of said amplifying devices, said energy storing means being coupled together in aiding relationship, and a diode connected in parallel with each amplifying device, with its cathode connected to the positive terminal thereof, the diodes alternately by-passing current derived from said stored energy about said amplifying devices during the intervals when no current is circulating through either amplifying device.

8. Apparatus as claimed in claim 7 in which each of said diodes is coupled through the energy storing means in the circuit of the amplifying element which it by-passes to the energy storing means in the circuit of the other rectifying element and by-passes current derived from the energy originally stored in said last named energy storing means.

9. A low frequency amplifier according to claim 7 in which said means for supplying said elements with a higher frequency signal is a modulator adapted to convert an input signal of varying frequency and amplitude into triangular waves of high fundamental frequency and constant amplitude, such that the relationship between the duration of the positive and negative peaks is a function of the varying voltage of said input signal, said triangular waves being obtained automatically by negatively feeding back the signal derived from said last stage through said modulator to each of said amplifying elements at a point between its input and its output.

10. A low frequency electronic amplifier for amplifying an input signal comprising in the last stage thereof a pair of amplifying tubes, each having an anode, a cathode and at least one control grid adapted to render them alternatively highly conductive and completely non-conductive when suitable potentials are applied thereto, said tubes being symmetrically connected for alternate operation with their cathodes connected to each other, an inductance in the anode circuit of each tube, said inductances being coupled to each other, a load connected to the free ends of said inductances, means to supply a mid point of said load with a voltage source, means for supplying to said control grid an alternating signal having a frequency several times higher than the highest frequency range of said input signal in such manner that the alternating signal supplied to the grid of one amplifying tube is opposite to the signal being simultaneously supplied to the grid of the other tube, and a diode connected in parallel with each amplifying tube, said diodes alternately by-passing currents derived from said inductances about said amplifying tubes during the intervals when no current is circulating through either amplifying tube.

11. A low frequency electronic amplifier for amplifying an input signal comprising in the last stage thereof a pair of amplifying tubes, each having an anode, a cathode and at least one control grid adapted to render them alternatively highly conductive and completely non-conductive when suitable potentials are applied thereto, said tubes being symmetrically connected for alternate operation with their cathodes connected to each other, an inductance in the anode circuit of each tube, said inductances being coupled to each other, a load coupled to said free ends by means of a suitable transformer, means to supply a mid point of said transformer with a voltage source, said means for supplying to said control grid an alternating signal having a frequency several times higher than the highest frequency range of said input signal in such manner that the alternating signal supplied to the grid of one amplifying tube is opposite to the signal being simultaneously supplied to the grid of the other tube, and a diode connected in parallel with each amplifying element, said diodes alternately by-passing current derived from said inductances about said amplifying tubes during the intervals when no current is circulating through either amplifying tube.

12. A low frequency electronic amplifier comprising in its last stage at least one pair of electronic amplifying devices, each having a positive electrode, a negative electrode, and a control element comprising at least one grid positioned between said electrodes, said amplifying devices being symmetrically connected between ground and a voltage source for operation on the all-or-nothing principle, with each of one pair of electrodes of the same sign being connected to said voltage source through separate electro-magnetic means for transiently storing energy and transformer coil means successively, said energy-storing means being inductively coupled together in aiding relationship, means for alternately causing one of said amplifying devices to become conductive and the other non-conductive, said means comprising means for supplying to each of said control elements an alternating signal of a frequency several times higher than the highest frequency of the low frequency range to be transmitted, the modulation factor of which varies as a function of the instantaneous value of said low frequency signal, the signal supplied to one control element of said pair being equal and opposite in sign to that simultaneously supplied to the other control element of said pair, and a diode connected in parallel with each amplifying device with the cathode of said diode connected to the positive electrode of said device to by-pass as a current thereabout stored energy released by said energy-storing means when the other amplifying device of said pair becomes non-conductive, said released energy biasing said by-passed amplifying device to a non-conductive state until it has passed through said diode, and said transformer coil means serving as the primary of a transformer which delivers the amplified signal.

13. A low frequency electronic amplifier as claimed in claim 12 in which said alternating signal supplying means comprises a modulator converting an input signal of varying frequency and amplitude into waves of substantially rectangular form of high fundamental frequency and constant amplitude.

14. A low frequency electronic amplifier as claimed in claim 12 in which alternating signal supplying means comprises a modulator converting an input signal of varying frequency and amplitude into waves of substantially triangular form of high fundamental frequency and constant amplitude.

15. A low frequency electronic amplifier as claimed in claim 12 in which capacitance means is connected across said coil to by-pass alternating current of said higher frequency.

16. A low-frequency electronic amplifier as claimed in claim 12 comprising negative feed-back means applied between the positive terminal and the control means of each of said amplifying devices.

References Cited in the file of this patent

UNITED STATES PATENTS

| | | |
|---|---|---|
| 2,063,025 | Blumlien | Dec. 8, 1936 |
| 2,453,787 | Downs | Nov. 16, 1948 |
| 2,591,406 | Carter et al. | Apr. 1, 1952 |
| 2,676,253 | Ayres | Apr. 20, 1954 |